No. 662,203. Patented Nov. 20, 1900.
P. T. SIEVERT.
APPARATUS FOR MANUFACTURING HOLLOW GLASS ARTICLES.
(Application filed Dec. 29, 1899.)
(No Model.)

Witnesses:
George Barry Jr.
Edward Vieser.

Inventor:
Paul Theodor Sievert
by attorneys
Brown & Seward

UNITED STATES PATENT OFFICE.

PAUL THEODOR SIEVERT, OF DRESDEN, GERMANY.

APPARATUS FOR MANUFACTURING HOLLOW GLASS ARTICLES.

SPECIFICATION forming part of Letters Patent No. 662,203, dated November 20, 1900.

Original application filed January 31, 1899. Serial No. 704,054. Divided and this application filed December 29, 1899. Serial No. 742,005. (No model.)

*To all whom it may concern:*

Be it known that I, PAUL THEODOR SIEVERT, a subject of the King of Saxony, and a resident of Dresden, in the Kingdom of Saxony, German Empire, have invented a new and useful Improvement in Apparatus for the Manufacture of Hollow Glass Articles, of which the following is a specification.

This improvement relates to apparatus employed for performing a process of manufacturing hollow glass articles, which is the subject-matter of my United States Letters Patent No. 651,059, dated June 5, 1900.

An apparatus embodying the present invention consists of a hollow slab or flat or approximately flat plate in which are one or more perforations and upon which the molten glass is to be placed as a plastic layer, a frame for the purpose of confining the said layer to the said slab or plate at the edges of the latter or in any outline corresponding with the marginal contour of the hollow body to be produced, and means for introducing the elastic pressure medium through the perforation or perforations of the said slab or plate for blowing up the plastic glass into the desired hollow form. The apparatus may also include means—a platen, for example—for the purpose of evening the molten glass layer upon the perforated slab or plate prior to the blowing up.

Figure 1:
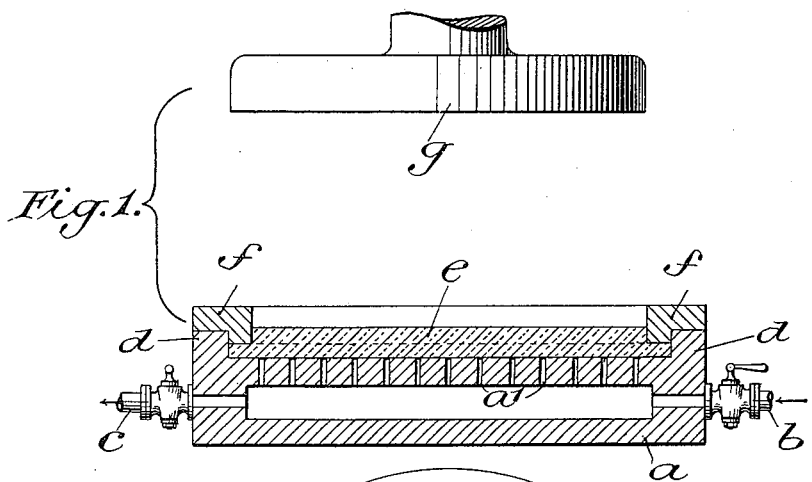
Figure 3:
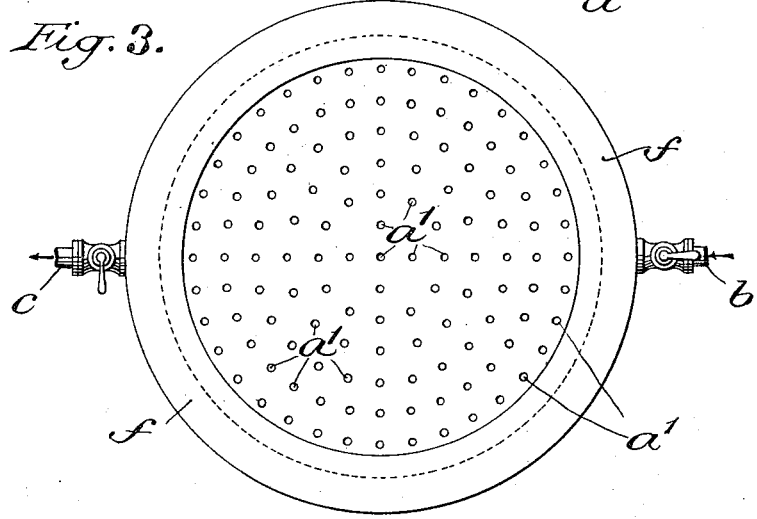
Figure 2:
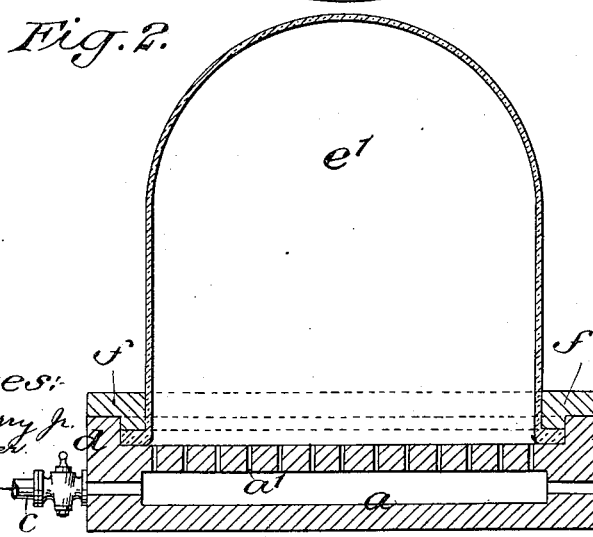

Figure 1 represents a central vertical section of a very simple example of my apparatus with the plastic layer of glass spread upon the slab or plate, but not yet blown up; Fig. 2, a similar section with the glass blown up into a hollow body; Fig. 3, a plan of the slab or plate and the holding-frame.

$a$ is the hollow slab or plate, hereinafter termed the "slab," in communication with the internal cavity of which are an inlet-pipe $b$ and an outlet-pipe $c$, each provided for the regulation of the tension of the elastic pressure medium with a cock or valve. The said slab may be of any suitable form, according to the contour of the margin or base of the hollow article or body to be produced, the example illustrated being of circular form. This slab has around it an upwardly-projecting rim $d$, which forms above it a shallow chamber or receptacle for the molten glass $e$, the said rim preventing the overflow of the said glass. The bottom of this receptacle, which constitutes the face of the slab, has in it any number of perforations $a'$, one or more, for the issue of the elastic pressure medium from the internal cavity of the slab.

$f$ is the metal frame for holding down upon the slab the layer $e$ of molten or plastic glass. The said frame in the example represented is adapted to fit within the rim $d$ of the slab in such manner as to indent itself into the glass, and it has a flange which overlaps the said rim. The said frame may be held down upon the edges of the layer of glass $e$ in any suitable manner, as by its own weight.

$g$ is a platen for evenly and smoothly spreading out the layer of glass upon the slab.

In the operation performed by this apparatus while the inlet-valve at $b$ is closed glass is poured upon the slab within the rim $d$ thereof and spread evenly thereon by suitable means, as by the platen $g$, which may be operated by any suitable means. The platen or spreading and evening device being then moved out of the way, the frame $f$ is put in place within the rim $d$ and on the glass and the valve at $b$ is opened. The elastic pressure medium, which may be steam or compressed air, being thus admitted through the internal cavity of the slab issues through the perforation or perforations $a'$ and blows out the glass into the surrounding open air in the form of a hollow article or body, such as is designated by $e'$ in Fig. 2, the contour and margin of which conform to that of the interior of the frame $f$. The hollow article or body thus formed may serve as a cover to any object, or it may after the frame $f$ has been removed from it have its top and the projection around its edges cut off and then be slit along its side and laid out in the form of a plate or sheet. The wall thickness of this hollow article or body depends in part on that of the molten-glass layer and on the degree of pressure employed. Experience will soon teach each workman how thick the layer and how high the pressure must be to produce the desired wall thickness, the pressure being regulated by the valves at the inlet $b$ and outlet $c$. When the desired height of the body has been attained, the pressure is shut off at $b$.

What I claim as my invention is—

1. An apparatus for the manufacture of hollow glass articles consisting of a hollow slab adapted to receive upon it a layer of molten glass and having an inlet for an elastic pressure medium and perforated for the issue of said medium, and means for holding such layer to said slab, substantially as herein described.

2. In an apparatus for the manufacture of hollow glass articles, the combination with a hollow slab having an inlet for an elastic pressure medium and perforated for the issue of said medium and having a surrounding projecting rim forming a receptacle for a layer of molten glass, of a frame fitted within said projecting rim for holding such layer upon said slab, substantially as herein described.

3. In an apparatus for the manufacture of hollow glass articles, the combination with a hollow slab or plate having an inlet and outlet to and from its internal cavity for an elastic pressure medium and perforated for the issue of said medium against a layer of plastic glass spread upon its face, of means for holding down the said layer upon said slab or plate on suitable outlines, and valves at said inlet and outlet for regulating the tension of the elastic pressure medium, substantially as herein described.

4. In an apparatus for the manufacture of hollow glass articles, the combination with a hollow slab or plate having an inlet for an elastic pressure medium and perforated for the issue of said medium and having a projecting rim surrounding said perforations and forming a chamber for the reception of plastic glass, of means for evenly spreading the said layer within said chamber, substantially as herein described.

In testimony that I claim the foregoing as my invention I have signed my name, in presence of two witnesses, this 27th day of November, 1899.

PAUL THEODOR SIEVERT.

Witnesses:
 HERNANDO DE SOTO,
 PAUL ARRAS.